No. 857,933.
PATENTED JUNE 25, 1907.
P. G. GESFORD.
TIRE STRUCTURE.
APPLICATION FILED NOV. 21, 1906.
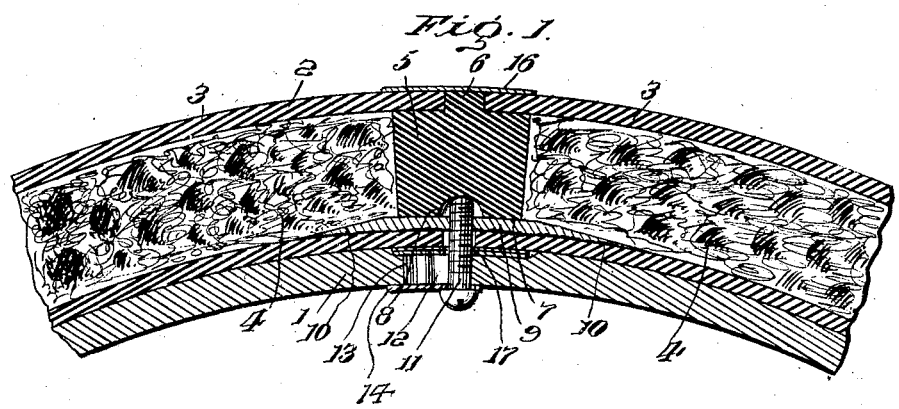
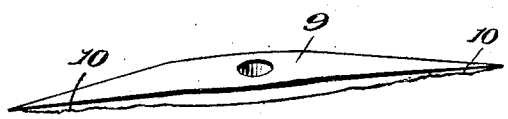
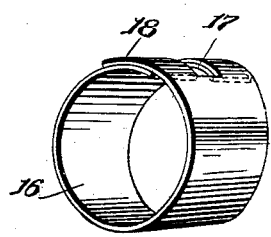
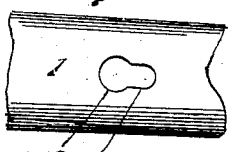
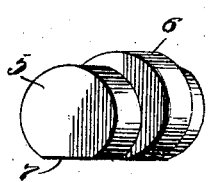
Witnesses
Inventor
P. G. Gesford
By
Attorneys

UNITED STATES PATENT OFFICE.

PRESTON G. GESFORD, OF ORTING, WASHINGTON.

TIRE STRUCTURE.

No. 857,933.  Specification of Letters Patent.  Patented June 25, 1907.

Application filed November 21, 1906. Serial No. 344,474.

*To all whom it may concern:*

Be it known that I, PRESTON G. GESFORD, a citizen of the United States, residing at Orting, in the county of Pierce and State of Washington, have invented certain new and useful Improvements in Tire Structures, of which the following is a specification.

The object of my invention is to provide an improved construction of tire adapted for bicycles, automobiles and vehicles in general, and possessing characteristics of simplicity, cheapness in manufacture, durability and efficiency, and which may be readily applied to and detached from the felly of a wheel.

With this and other objects in view as will more fully appear as the description proceeds, the invention consists in certain constructions and arrangements of parts hereinafter specifically described and claimed.

For a full description of the invention and the merits thereof and also to acquire a knowledge of the details of construction of the means for effecting the result, reference is to be had to the following description and accompanying drawings, in which:

Figure 1 is a longitudinal sectional view of a portion of a wheel felly having my improved tire applied thereto; Fig. 2 is a detail perspective view of the yoke bar employed; Fig. 3 is a similar view of the ferrule; Fig. 4 is a detail perspective view of the plug hereinafter described; and, Fig. 5 is a detail perspective view of the bolt locking plate. Fig. 6 is a detail view illustrating a slot in the felly to which my improved tire is applied.

Corresponding and like parts are referred to in the following description and indicated in all the views of the drawings by the same reference characters.

Referring to the drawings, the numeral 1 designates the felly of a wheel and 2 the tire. The tire proper consists of a tubular or hose-like envelop 3 which may be of any cross sectional contour, but which in the present instance, is shown as round and as constructed of rubber with canvas or other textile fabric embedded therein. To obtain the desired resiliency for the tire, without detracting from its durability and longevity, I provide a filling 4 for the envelop 3, the said filling being composed of cork or hair, or a combination of the two, the cork being preferably comminuted.

The tire 2 may be constructed in any desired number of sections around the felly of the wheel or in a one-piece tube split or cut at one point only, and at the joint between the abutting ends of every two sections, I provide fastening devices for securely holding the sections together and for holding the respective sections to the wheel. I shall now describe these fastening devices.

5 designates a plug preferably constructed of rubber and said plug is provided with a middle flange 6 extending transversely thereof, and terminates in a flat side 7 which is disposed, in practical operation, toward the center or hub of the wheel. A socket 8 is formed in the flat side 7 of the plug 5, in line with the ends of the flange 6. In practical operation, this plug has its two ends fitted within the abutting ends of every two adjacent sections of the tire, the flange 6 abutting against opposite ends of the envelop as shown.

A metallic yoke bar 9, which is an elongated piece of metal, as shown, tapering from its middle toward both ends, has each end inserted in one of the two adjacent ends of the tire sections and said yoke bar is preferably provided on the inner face with serrations or rough surfaces 10 that are adapted to frictionally engage the inner side of the envelop. At its middle, the yoke bar 9 is provided with a threaded aperture through which the threaded bolt 11 works, said bolt extending outwardly through a slot 12 in the felly of the wheel. The slot 12 communicates at one end with an enlarged opening 13 designed to admit the passage of the head of the bolt, and it is to be understood that this bolt may be a winged bolt or a square headed bolt for the application of a wrench, or a screw bolt.

14 designates a lock plate which is provided with a forked end 15 designed to straddle the shank of the bolt 11 underneath the head thereof and to cover the enlarged opening 13 when the bolt is in the slot 12. The plate 14, by frictional engagement with the felly, tends to prevent the bolt from working out of the slot into the enlarged opening where it might pass freely therethrough and cause the accidental detachment of the tire. It is to be understood that when the tire is in place, the bolt 11 extends through the felly of the wheel and through the yoke bar 9 with its outer end extending into the socket 8 in the plug 5. A ferrule 16 which may be constructed of spring-brass, or steel, or rubber, or leather, encircles the envelop 3 at the joints and is provided with a slot 17 through which the bolt 11 also extends, to assist in fastening the tire to the felly. This ferrule, in the present instance, is shown in the form of a split band having overlapping forked ends 18 producing the slot 17. To remove any section of tire, so that it may be turned axially to present a different portion as the tread or for purposes of repair, or the like, the bolt 11 is first unloosened, the lock plate 14 is then removed and the tire is sprung circumferentially so as to carry the head of the bolt into the enlarged opening 13. Then the bolt is entirely withdrawn and the ferrule 16 is slipped to one side or the other, the abutting ends of the tire sections may then be sprung apart and the plug 5 removed. To replace a section, the yoke bar 9 is inserted in the two adjacent ends of the tire sections, and the tire is pushed nearly together. The rubber plug 5 is then inserted, the ferrule 16 slipped into place over the joint, the tire is pushed together tightly and the bolt is then inserted and locked.

From the foregoing description in connection with the accompanying drawings, it will be seen that I have provided a very simple construction of tire which may be very readily applied to and detached from the felly of a wheel and which is durable and efficient in operation.

Having thus described the invention, what is claimed as new is:

1. The combination with the felly of a wheel, of a tire mounted thereon and provided with a joint, a plug inserted within the opposite ends of the tire at the joint, said plug being provided in its innermost face with a socket, a ferrule adapted to encircle the tire at the joint, a yoke bar having its opposite ends inserted into the tire at the joint, and a bolt designed to extend through the felly and through the ferrule and into the said socket in the plug, said bolt having a threaded connection with the yoke bar.

2. A vehicle tire comprising an envelop provided with a joint, a plug inserted in the tire at the joint, a yoke bar having its opposite ends inserted in the tire at the joint, and a bolt secured to said yoke bar and extending through the same into the plug and adapted to secure the tire to the felly of a wheel.

3. A vehicle tire comprising an envelop provided with a joint, a plug inserted in the ends of the tire at the joint, said plug being provided with a flange adapted to be interposed between the abutting ends of the tire at the joint, a yoke bar extending into the tire at the joint, and a bolt threaded in said yoke bar and arranged to secure the tire to the felly of the wheel.

4. A vehicle tire consisting of an envelop provided with a joint, a plug adapted to be inserted in the tire at the joint, a yoke bar extending across the joint of the tire and located within the same, an encircling ferrule for the joint, and a bolt threaded into the yoke bar and passing through said ferrule and adapted to secure the tire to the felly of the wheel.

5. The combination with the felly of a wheel provided with a slot, a tire encirling said felly and provided with a joint, a yoke bar extending across the joint and located within the tire and provided with a threaded aperture, a ferrule encircling the tire at the joint and constructed of a split band having overlapping forked ends adapted to produce a slot, and a bolt extending through the slot in the felly and through the slot in the ferrule and working in the yoke bar, as and for the purpose set forth.

6. The combination with the felly of a wheel provided with a slot and an enlarged opening communicating with said slot, of a tire provided with a joint and encircling said felly, a ferrule encircling the tire at the joint and provided with a slot, a bolt adapted to pass through the enlarged opening in the felly to rest in the slot of the same, said bolt extending through the slot in the ferrule, a bifurcated locking plate adapted to straddle the shank of the bolt and adapted to cover the enlarged opening of the felly, and a yoke bar extending across the joint and located within the tire and provided with a threaded aperture, the bolt working in said aperture.

In testimony whereof I affix my signature in presence of two witnesses.

PRESTON G. GESFORD. [L. S.]

Witnesses:
  SAML. HOWARD,
  D. F. RAVENS.